Patented Feb. 18, 1930

1,747,188

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

VULCANIZATION OF RUBBER

No Drawing.   Application filed October 11, 1928.   Serial No. 311,980.

The present invention relates to the vulcanization of rubber. More particularly the invention relates to the production of a vulcanized rubber of high quality and possessing desirable characteristics by a process wherein a new type of accelerator is used for the vulcanization step. The manufacture and use of the new type of accelerator will be fully understood from the following description and example.

It has been found, as disclosed in my issued Patent No. 1,656,834 of January 17, 1928, that the aliphatic aldehyde derivatives of the reaction products of organic bases, as for example diphenyl-guanidine, and mercapto compounds, for example mercapto-benzo-thiazole, constitute an important group of rubber vulcanization accelerators.

It has now further been found, as disclosed in the present application which is a continuation of my issued Patent 1,656,834, that the aliphatic aldehyde derivatives of the reaction products of alphatic aldehyde ammonias, as for example hexamethylene-tetramine, and mercapto-benzo-thiazole, likewise constitute an important group of rubber vulcanization accelerators.

The following is one example of a preferred method of manufacturing one of my new type of accelerating compounds. Approximately one molar portion of a mercapto-aryl-thiazole, for example 167 parts by weight of mercapto-benzo-thiazole, was combined with approximately one molar portion (140 parts by weight) of hexa-methylene-tetramine (dry or in aqueous solution as preferred), by heating at a temperature of 150° C. or thereabout for approximately an hour, during which time a reaction takes place. After the initial reaction is over, the mixture is heated to about 200° C. and maintained thereat for a period of about four hours, whereupon, after cooling, a dark resinous product is obtained. Other proportions of the reacting ingredients may also be employed than those mentioned above. Thus, instead of reacting equi-molar portions of the materials as shown, I may combine one molar portion of hexa-methylene-tetramine with one, two or three molar portions of mercapto-benzo-thiazole, or otherwise.

Approximately 50 parts by weight of the reaction product of mercapto-benzo-thiazole and hexa-methylene-tetramine obtained as described, were placed in a reactor equipped with an agitator and reflux condenser and melted so that agitation could be effected. Approximately 25 parts by weight of crotonaldehyde were added with agitation slowly thereto at a temperature of approximately 90 to 120° C. at such a rate that the frothing and refluxing of the aldehyde which occurs could be controlled. The mixture was heated and agitated for a short period after all the aldehyde was added in order to complete the reaction. Upon cooling, the product formed was a hard resin possessing a not objectionable odor. Its usefulness as an accelerator is greatly enhanced because of its resinous nature whereby its ready and complete dispersion into the rubber mix can be accomplished. This material is designated as accelerator "A" in the tables following.

Other aliphatic aldehydes may be reacted in a similar manner to that hereinbefore described with the reaction product of mercapto-benzo-thiazole and an aliphatic aldehyde ammonia to form my preferred type of accelerators. Thus, the aldol, butylaldehyde, and acetaldehyde derivatives of the reaction product of mercapto-benzo-thiazole and hexamethylene-tetramine have been prepared and tested as rubber vulcanization accelerators. They are designated as accelerators "B", "C" and "D" respectively, in the tables following.

The formaldehyde derivative of the reaction product of hexa-methylene-tetramine and mercapto-benzo-thiazole has also been prepared in an analogous manner to that previously described, and is a further example of my preferred type of accelerators.

One method of employing this new type of compound in a rubber mix is illustrated by the following examples wherein 100 parts of pale crepe rubber,
5 parts of zinc oxide,
3 parts of sulfur,
0.5 parts of accelerator are compounded together in the usual manner on the differential mixing mills.

The rubber compound so prepared was then vulcanized in the usual manner by heating in a press for different periods of time at different steam pressures and the following tensile data obtained.

| Accelerator | Time of cure minutes | Pressure pounds steam | Modulus of elasticity in lbs./in² at elongations of | | | Tensile at break | Elongation at break |
|---|---|---|---|---|---|---|---|
| | | | 300% | 500% | 700% | | |
| A | 30 | 10 | 155 | 305 | 1005 | 2155 | 850 |
| B | 30 | 10 | 86 | 131 | 314 | 1325 | 990 |
| C | 30 | 10 | 206 | 535 | 2170 | 3130 | 780 |
| D | 30 | 10 | 161 | 334 | 1060 | 2275 | 860 |
| A | 60 | 10 | 241 | 468 | 1735 | 2610 | 780 |
| B | 60 | 10 | 137 | 254 | 816 | 2115 | 880 |
| C | 60 | 10 | 273 | 721 | 2980 | 3405 | 750 |
| D | 60 | 10 | 214 | 505 | 1820 | 2840 | 780 |
| A | 30 | 20 | 210 | 465 | 1840 | 2735 | 780 |
| B | 30 | 20 | 126 | 247 | 836 | 2140 | 870 |
| C | 30 | 20 | 314 | 920 | 3670 | 3670 | 700 |
| D | 30 | 20 | 219 | 521 | 1930 | 3100 | 810 |
| A | 60 | 20 | 242 | 605 | 2385 | 3145 | 760 |
| B | 60 | 20 | 170 | 360 | 1270 | 2575 | 850 |
| C | 60 | 20 | 363 | 1180 | ------ | 3895 | 680 |
| D | 60 | 20 | 266 | 666 | 2435 | 3180 | 750 |
| A | 15 | 40 | 229 | 571 | 2100 | 3280 | 790 |
| B | 15 | 40 | 151 | 308 | 1015 | 2150 | 850 |
| C | 15 | 40 | 353 | 1140 | ------ | 3740 | 680 |
| D | 15 | 40 | 220 | 531 | 1970 | 3175 | 790 |
| A | 30 | 40 | 270 | 683 | 2375 | 3180 | 780 |
| B | 30 | 40 | 174 | 374 | 1265 | 2545 | 830 |
| C | 30 | 40 | 420 | 1465 | ------ | 3260 | 650 |
| D | 30 | 40 | 256 | 564 | 2250 | 3145 | 760 |

The above tensile data shows that the preferred class of compounds constitute an important group of rubber vulcanization accelerators.

Other aldehyde ammonias, for example aldol ammonia, propionic aldehyde ammonia, crotonaldehyde ammonia, and the like may be reacted with a mercapto-aryl-thiazole and the product further reacted with an aliphatic aldehyde in an analogous manner to that previously described to form the preferred type of accelerator. Furthermore, aliphatic aldehydes may react with the reaction product of mercapto-benzo-thiazole and aliphatic aldehyde ammonias, for example, hexa-methylene-tetramine, in ratios other than substantially 25 parts of aldehyde to substantially 50 parts of the reaction product of hexa-methylene-tetramine and mercapto-benzo-thiazole. Thus, substantially 50 parts of crotonaldehyde were combined with about 200 parts of the reaction product of hexa-methylene-tetramine and mercapto-benzo-thiazole and was found to be a desirable vulcanization accelerator.

What is claimed is:

1. The process of vulcanizing rubber which comprises heating rubber and sulfur in the presence of an accelerator including an aliphatic aldehyde derivative of the reaction product of an aliphatic aldehyde ammonia and mercapto-benzo-thiazole.

2. The process of vulcanizing rubber which comprises heating rubber and sulfur in the presence of an accelerator including an aliphatic aldehyde derivative of the reaction product of hexa-methylene-tetramine and mercapto-benzo-thiazole.

3. The process of vulcanizing rubber which comprises heating rubber and sulfur in the presence of an accelerator including an aliphatic aldehyde derivative of the reaction product of substantially equi-molar portions of hexa-methylene-tetramine and mercapto-benzo-thiazole.

4. The process of vulcanizing rubber which comprises heating rubber and sulfur in the presence of an accelerator including a crotonaldehyde derivative of the reaction product of an aliphatic aldehyde ammonia and mercapto-benzo-thiazole.

5. The process of vulcanizing rubber which comprises heating rubber and sulfur in the presence of an accelerator including a crotonaldehyde derivative of the reaction product of hexa-methylene-tetramine and mercapto-benzo-thiazole.

6. The process of vulcanizing rubber which comprises heating rubber and sulfur in the presence of an accelerator including a crotonaldehyde derivative of the reaction product of substantially equi-molar portions of hexa-methylene-tetramine and mercapto-benzo-thiazole.

7. The vulcanized rubber product prepared by heating rubber and sulfur in the presence of an accelerator including an aliphatic aldehyde derivative of the reaction product of an aliphatic aldehyde ammonia and mercapto-benzo-thiazole.

8. The vulcanized rubber product prepared by heating rubber and sulfur in the presence of an accelerator including an aliphatic aldehyde derivative of the reaction product of hexa-methylene-tetramine and mercapto-benzo-thiazole.

9. The vulcanized rubber product prepared by heating rubber and sulfur in the presence of an accelerator including an aliphatic aldehyde derivative of the reaction product of substantially equi-molar portions of hexa-methylene-tetramine and mercapto-benzo-thiazole.

10. The vulcanized rubber product prepared by heating rubber and sulfur in the presence of an accelerator including a crotonaldehyde derivative of the reaction product of an aliphatic aldehyde ammonia and mercapto-benzo-thiazole.

11. The vulcanized rubber product prepared by heating rubber and sulfur in the presence of an accelerator including a crotonaldehyde derivative of the reaction product of hexa-methylene-tetramine and mercapto-benzo-thiazole.

12. The vulcanized rubber product prepared by heating rubber and sulfur in the presence of an accelerator including the crotonaldehyde derivative of the reaction product of substantially equi-molar portions of hexa-methylene-tetramine and mercapto-benzo-thiazole.

13. The process of vulcanizing rubber which comprises heating rubber and sulfur in the presence of an accelerator including an aliphatic aldehyde derivative of the reaction product of an aliphatic aldehyde ammonia condensation product and mercapto-benzo-thiazole.

14. The process of vulcanizing rubber which comprises heating rubber and sulfur in the presence of an accelerator including the crotonaldehyde derivative of the reaction product of an aliphatic aldehyde ammonia condensation product and mercapto-benzo-thiazole.

15. The vulcanized rubber product prepared by heating rubber and sulfur in the presence of an accelerator including an aliphatic aldehyde derivative of the reaction product of an aliphatic aldehyde ammonia condensation product and mercapto-benzo-thiazole.

16. The vulcanized rubber product prepared by heating rubber and sulfur in the presence of an accelerator including the crotonaldehyde derivative of an aliphatic aldehyde ammonia condensation product and mercapto-benzo-thiazole.

In testimony whereof I hereunto affix my signature.

WINFIELD SCOTT.